United States Patent [19]
Dunn

[11] Patent Number: 5,902,087
[45] Date of Patent: May 11, 1999

[54] CYNLINDRICAL BALE TRAILER

[76] Inventor: Ronald Emmett Dunn, 1820 Slayden, Moscow, Tenn. 38057

[21] Appl. No.: 09/096,478

[22] Filed: Jun. 12, 1998

[51] Int. Cl.$^6$ ....................................................... B60P 1/24
[52] U.S. Cl. .............................. 414/24.5; 298/18; 414/470
[58] Field of Search ............................. 298/18; 414/24.5, 414/24.6, 470

[56] References Cited

U.S. PATENT DOCUMENTS

| | | | |
|---|---|---|---|
| 4,079,996 | 3/1978 | Vansickle | 298/18 X |
| 4,138,159 | 2/1979 | Hall | 298/18 |
| 4,261,676 | 4/1981 | Balling, Sr. | 414/24.5 |
| 4,411,572 | 10/1983 | Hostetter | 414/470 X |
| 5,123,800 | 6/1992 | Druse, Sr. | 298/18 X |
| 5,137,412 | 8/1992 | McAdams et al. | 298/18 X |

*Primary Examiner*—Janice L. Krizek
*Attorney, Agent, or Firm*—John J. Mulrooney

[57] ABSTRACT

A trailer is designed to receive, transport and unload large cylindrical bales of agricultural products such as hay, including bales which may be out-of-round due to a flat side caused by settlement during storage or transport. The trailer has a wheel-mounted frame extending the full length of the trailer and a plurality of cradles mounted on the frame to receive and support the bales. Each cradle has a latch by which the cradle may be released from its normally horizontal position to rotate under the force of gravity to an unload position. During rotation of the cradles to the unload position, pusher or kicker members contact and propel the bales outwardly from the cradles to insure that the bales land and/or come to rest on the ground in the desired position with their round sides in contact with the ground. In a first embodiment, a kicker mechanism moves relative to the rotating cradle, while in a second embodiment the kicker is a stationary member rigidly attached to the frame. The cradles may be oriented on the trailer either with the bales' longitudinal axes transverse to the trailer frame to provide for an end-over-end unload of the bales, or with the bales' longitudinal axes parallel to the trailer frame to provide for a rolling unload of the bales.

16 Claims, 4 Drawing Sheets

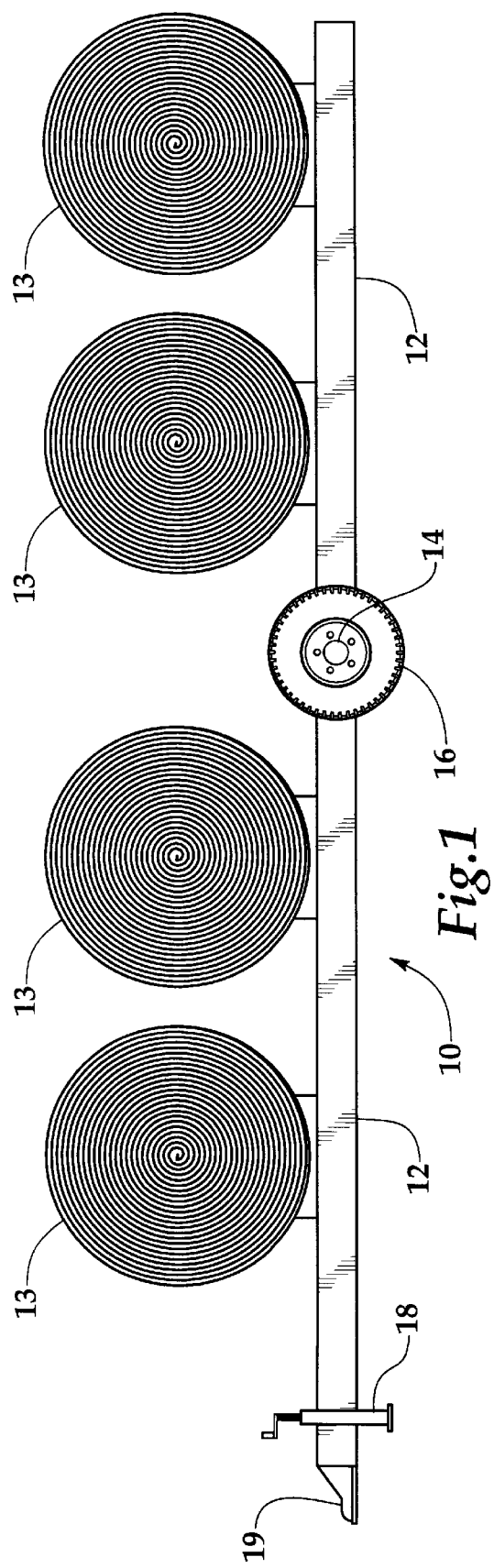
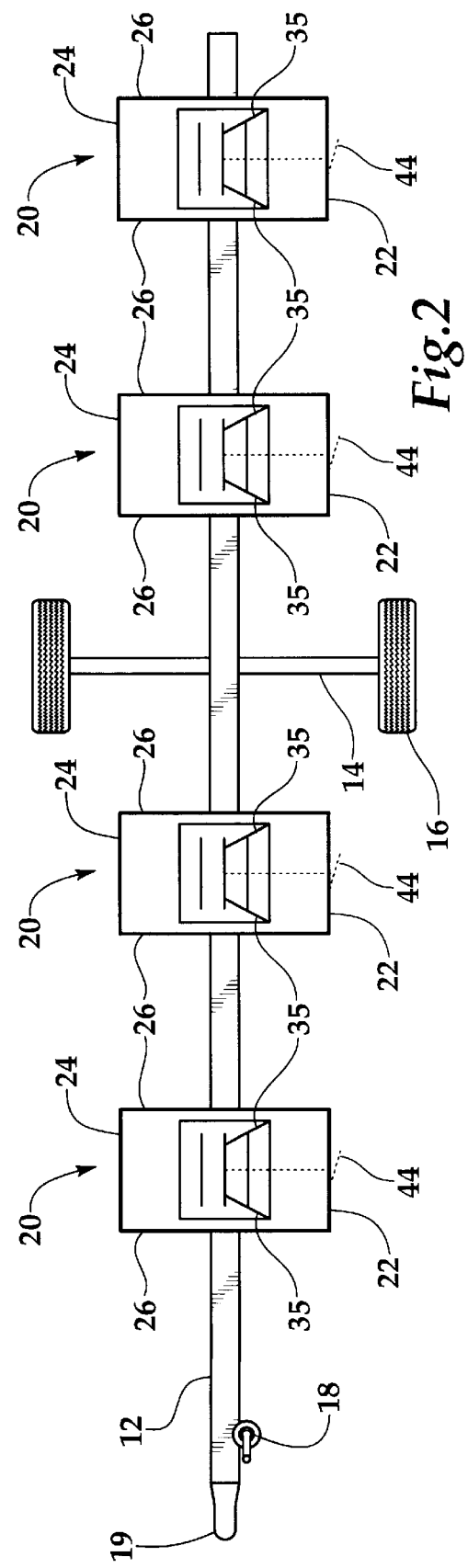

5,902,087

CYNLINDRICAL BALE TRAILER

BACKGROUND OF THE INVENTION

1. Field of the Invention

This invention relates to a trailer for receiving, transporting and unloading large cylindrical bales of agricultural products, and, in particular, to a cylindrical bale trailer which uses the force of gravity to unload the bales so that the round side of the bale is always in contact with the ground, and which is capable of automatically unloading bales which are out-of-round, i.e., flattened on one side, and resistant to rolling motion.

2. Description of Related Art

Present farming methods involve the processing of hay and other agricultural products in the field into large cylindrical bales having a round side surface and two flat end surfaces, which are approximately 4–5 feet in length, 5 feet in diameter, and weigh as much as 2000 pounds. Such bales of agricultural products are used as feed for livestock. Typically, cylindrical bales are prepared and stored in the field for many months before being used as feed. In order to protect the bales from rain during storage, the bales are made with a tightly wound round surface which tends to shed water better than the flat end surfaces. Therefore, it is desirable to store large cylindrical bales with their round surface touching the ground, i.e., the watershed orientation. Moreover, when the bales are distributed for use as livestock feed, it is also desirable to place the bales with the round surface on the ground because the bale ends are the desirable places on the bale for livestock to feed.

The size of these cylindrical bales makes manual handling by laborers impractical, if not impossible, and the loading, transporting and unloading of such bales has become a problem which is not effectively or efficiently solved by utilizing conventional farm equipment. A need for specialized equipment for loading, transporting and unloading such large cylindrical bales has been recognized, and a number of specialized trailers have been previously proposed for this purpose. However, the specialized bale carriers known to applicant have disadvantages. Some of the prior devices such as disclosed in U.S. Pat. Nos. 5,123,800 and 5,137,412 are impossible to load using conventional farm equipment, e.g., a conventional 3-point hitch spear on a tractor rear or a spear mounted on a front end loader, because of the above-ground height and/or the orientation of the bale carrying cradle on the trailer. Some of the prior devices such as disclosed in U.S. Pat. No. 4,261,676 require a special hydraulic lift apparatus to load the bales and hydraulic ram apparatus to unload the bales. Some of the prior devices such as disclosed in U.S. Pat. No. 4,411,572 employ complex mechanical linkage to enable the bale cradle to rotate between transverse and longitudinal orientations to the trailer frame.

However, one problem which the prior devices do not discuss or attempt to solve is the settlement of the bales during storage and/or transport due to their great weight. This settling causes the part of the bale in contact with the ground or the carrying surface of a cradle to flatten, or go out-of-round. A flattened or misshapen bale poses a special handling problem because, when combined with the great weight of the bale, it causes the bale to resist rolling off of a bale cradle which is designed for gravity unload such as disclosed in U.S. Pat. Nos. 4,138,159, 4,411,572, 5,123,800, and 5,137,800. Because such flattened and out-of-round bales resist rolling and, thereby, will not self-unload under the force of gravity, these prior devices require additional handling and/or special equipment to unload.

SUMMARY OF THE INVENTION

This invention provides a cylindrical bale loading, transporting and unloading apparatus. This new apparatus permits the loading of bales with conventional equipment such as a standard 3-point hitch spear on a tractor rear or a spear mounted on a front-end loader, and avoids the necessity of special, expensive equipment such as a rear hydraulic assist fork lift for loading and unloading. This new apparatus permits gravity-powered self-unloading of bales without any additional equipment, and will unload bales which are flattened and out-of-round due to settlement during storage and/or transport. This new apparatus uses a kicker member to propel a bale from a cradle, and, therefore, is not dependent solely on the capacity of a bale to roll off of a cradle under the force of gravity to unload from the trailer. Also, this new trailer is not susceptible to unloading problems caused by flattened, misshapen and out-of-round bales. This new apparatus unloads cylindrical bales so that the bales always come to rest on the ground on their round sides to permit both maximum shedding of rain water and exposure of the bale ends to facilitate feeding of livestock.

Briefly stated, these objects and features are accomplished by a cylindrical bale trailer having a wheel-mounted frame extending the full length of the trailer and a plurality of cradles mounted on the frame to receive and support the bales. Each cradle has a latch by which the cradle may be released from its normally horizontal position to rotate under the force of gravity to an unload position. During rotation of the cradles to the unload position, pusher or kicker members associated with each cradle contact and propel the bales outwardly from the cradles to insure that the bales are both ejected from the cradle and land and/or come to rest on the ground in the desired position with their round sides in contact with the ground. In a first embodiment, a kicker mechanism moves relative to the rotating cradle, while in a second embodiment the kicker is a stationary member rigidly attached to the frame. The cradles may be oriented on the trailer either with the bales' longitudinal axes transverse to the trailer frame to provide for an end-over-end unload of the bales, or with the bales' longitudinal axes parallel to the trailer frame to provide for a rolling unload of the bales. A front end tongue and hitch permit the trailer to be drawn by a vehicle such as a truck or tractor.

BRIEF DESCRIPTION OF THE DRAWINGS

FIG. 1 is a side elevation view of the trailer of the present invention having four bale cradles in the transport position and with cylindrical bales loaded thereon with their longitudinal axes transverse to the trailer frame for an end-over-end unload.

FIG. 2 is a top view of the trailer of FIG. 1 without bales thereon.

DESCRIPTION OF THE PREFERRED EMBODIMENTS

Figure 3:
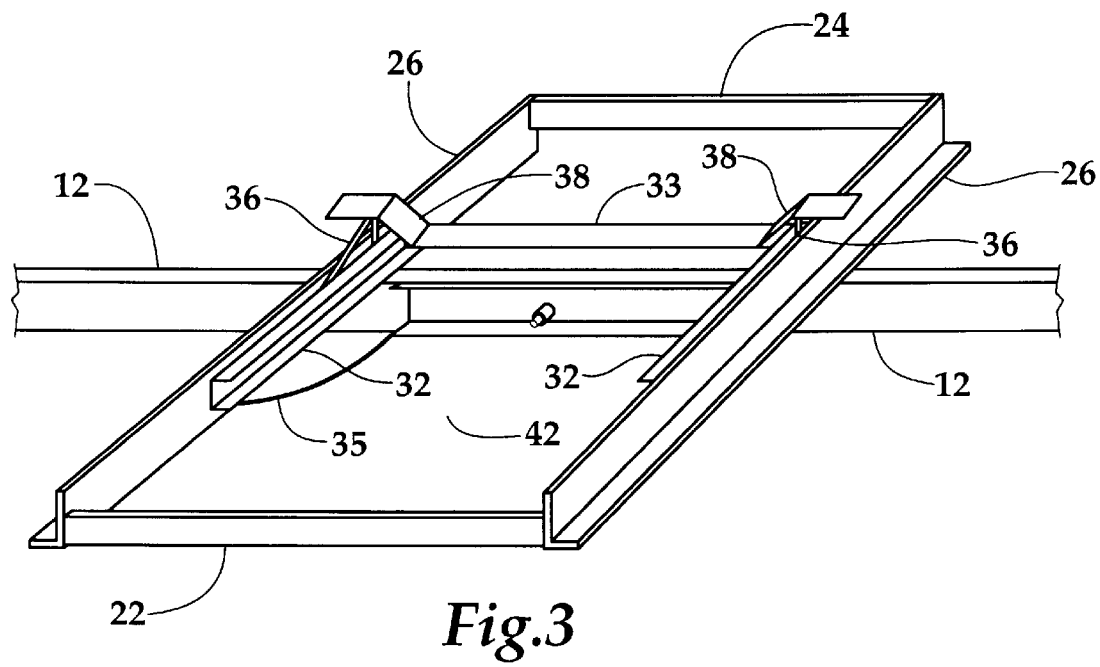
FIG. 3 is a perspective view of one bale cradle and its associated bale kicker mechanism in the horizontal bale transporting position.
Figure 4:
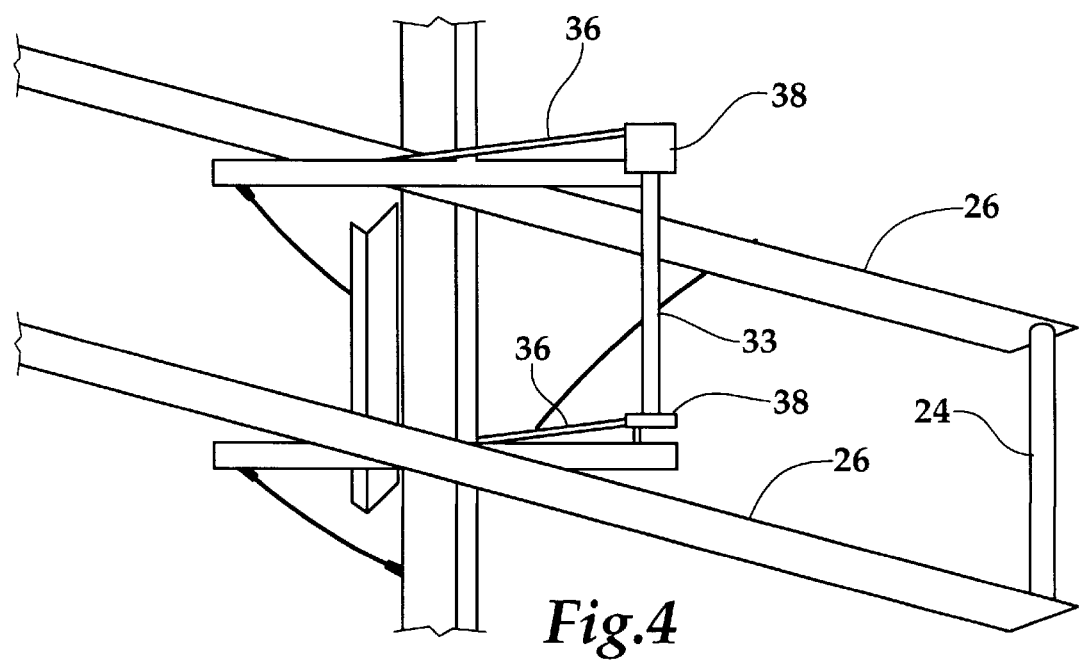
FIG. 4 is a perspective view of one bale cradle in its rotated, unload position and the associated bale kicker mechanism in its extended bale-contacting position.
Figure 5:
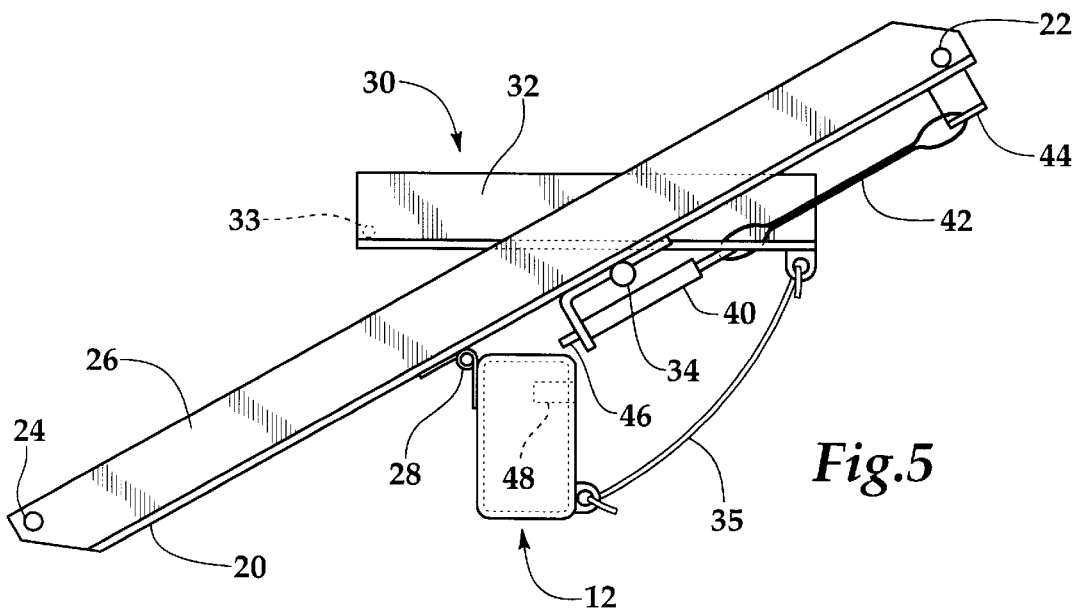
FIG. 5 is a side elevation view of a bale cradle in its rotated, unload position and the associated bale kicker mechanism in its extended, bale-kicking position.
Figure 6:
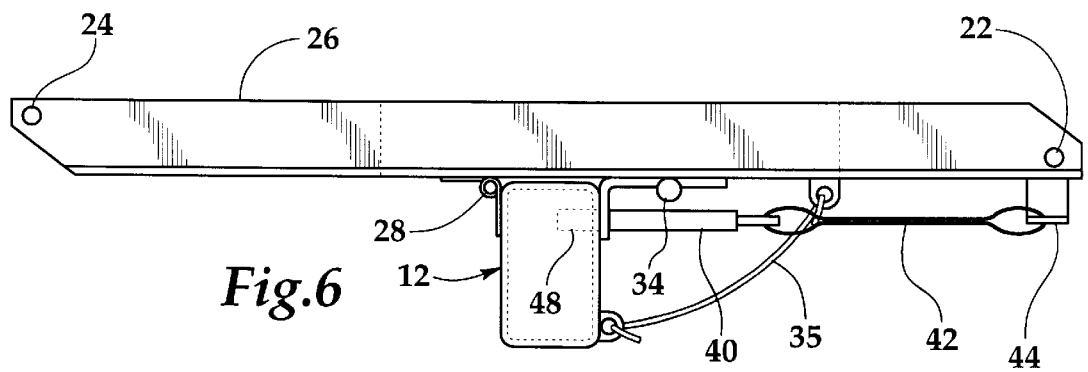
FIG. 6 is a side elevation view of the bale cradle and kicker mechanism in the transport position, and also showing the cradle latch mechanism.

Referring to the drawings, the reference numeral 10 generally indicates a trailer embodying the present invention which is useful for loading, transporting and unloading large, cylindrical bales of agricultural products such as hay, including bales which are out-of-round, or flat on one side, due to settlement during storage and/or transit.

The trailer generally includes a single square tube or beam member 12 which extends longitudinally the full length of the vehicle and forms the main frame thereof. The trailer has an axle 14 mounted transversely to the frame member 12 with wheels 16 rotatably mounted on opposite ends of the axle 14. A screw jack 18 is mounted adjacent the forward end of the trailer for support upon disconnection of the trailer from a towing vehicle such as a truck or tractor via a standard tongue and hitch assembly generally indicated at 19.

The frame 12 has at least one or, depending upon the number of bales 13 to be transported, a plurality of cradle assemblies 20 pivotally or rotatably mounted thereon. Each cradle is in the form of a rectangular frame having two end members 22 and 24, and two relatively longer side members 26. Referring to FIG. 3, the end member 22 is positioned lower on side members 26 to facilitate loading of a bale onto the cradle at that end, while end member 24 is positioned higher on side members 26 to engage the end of the bale and function as a stop and pivot point for the bale during unloading as hereinafter described. The cradles 20 are pivotally mounted on the frame tube 12 by hinges or other suitable pivotable mounting means 28 whereby the cradles are rotatable or pivotable from a horizontal, bale-transporting position to an unload, inclined position whereby the cradle unload end adjacent cradle end member 24 may or may not contact the ground. The cradle 20 is hinged on the frame 12 in an offset or biased position, whereby a larger part of the weight of a bale in the cradle will be toward the unload end of the cradle defined by end member 24. The orientation of the cradles 20 on the frame 12 is such that shorter side members 22 and 24 are parallel to frame member 12 and longer side members 26 are transverse to frame member 12. The dimensions of each cradle 20 are such that a bale will fit lengthwise within the ends 22 and 24, whereby, when the cradle is rotated to the unload position, an end of the bale will be in contact with cradle end member 24.

A bale kicker or pusher assembly generally indicated at 30 is pivotally mounted on and positioned within each cradle 20. The kicker 30 is movable relative to the cradle and functions to push or kick a bale and propel it outwardly from the cradle in an endover-end fashion to insure that even a flattened, out-of-round bale will be unloaded and always come to rest with the round side thereof in contact with the ground. The kicker mechanism consists of a U-shaped frame having parallel side members 32 and a transverse end member 33 connected between adjacent ends of sides 32 as shown. The sides 32 of the kicker U-shaped frame 30 are pivoted on cradle side members 26 by hinges or pivots 34, and the ends of side members 32 which are opposite end member 33, i.e., the open end of the U-shaped frame, are each connected by a fixed length of chain or cable 35 to trailer frame 12. The optimum length of the cables 35 is determined through experimentation to permit the cradle to rotate to an inclination where it is desirable to have the kicker arms 38 contact the bale and propel it out of the cradle. The chains 35 have some slack therein when the cradle 20 and kicker 30 mechanism are in the horizontal, transport position. However, when the cradle rotates to the unload position and the kicker rotates to the bale-contacting position, the chain 35 becomes taut as hereinafter described. The kicker side members 32 have upwardly angled arm members 36 with bale engaging kicker members 38 at the ends thereof.

Each cradle 20 has a latch mechanism generally indicated at 40 including a connecting member such as a chain or cable 42 which extends between a latch handle 44 positioned at the loading end of the cradle 20 and a release pin 46 which is designed to engage a hole 48 in frame 12. Pulling the handle 44 disengages the pin 46 from its lock position, releasing the cradle from its horizontal position and permitting the cradle to rotate under the force of gravity to the unload, inclined position, whereby the bale 13 will abut against the cradle end member 24. As the cradle rotates, the kicker mechanism, which is pivotally affixed to the cradle 20, will move relative to the frame 12, thereby causing the kicker mechanism chain 35 to become taut. When the kicker mechanism chain 35 becomes taut, the kicker mechanism will pivot with respect to cradle 20 so that kicker members 38 will rotate into and contact the bale 13, to thereby apply an outward force to the bale and propel the bale in an end-over-end fashion out of the cradle and onto the ground.

In the operation of the cylindrical bale trailer of the invention, the cradles 20 are locked in their horizontal, transport positions using the latch mechanism 40, and the bales are loaded onto the cradles by such conventional bale handling apparatus such as a standard 3-point hitch spear whereby the bale cylindrical axes will be transverse to the trailer frame 12. After transport by the trailer 10 to a desired location for either storage or distribution as livestock feed, a bale is unloaded from the trailer by pulling the latch release handle 44 for that cradle to cause the lock pin 46 to disengage from frame 12. The cradle will pivot under the force of gravity and rotate downwardly whereby one end of the bale will contact cradle end member 24. As the cradle 20 pivots downwardly, the kicker mechanism rotates upwardly and outwardly within the cradle, whereby the bale kicker members 38 will contact the bale and propel the bale outwardly from the cradle in an end-over-end fashion to insure that the bale comes to rest with its round side on the ground for storage and/or feeding of livestock. After unloading, the cradle is swung back to and locked in the horizontal, transport position where it is ready to receive another bale.

Figure 7:
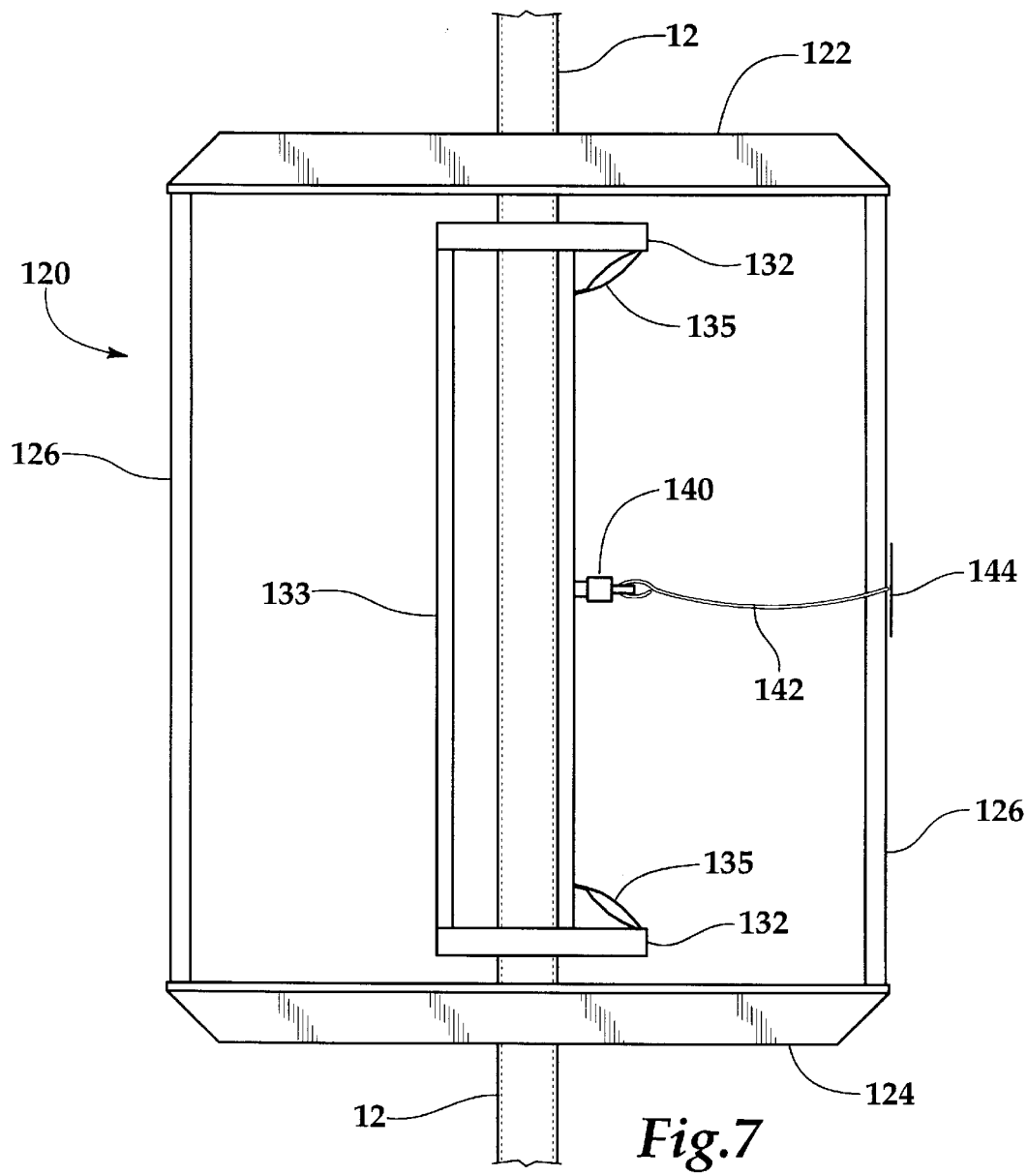
FIG. 7 is a top view of another embodiment of the bale cradle and associated bale kicker in which the cradle is adapted to transport a cylindrical bale with its longitudinal axis parallel to the trailer frame for a rolling unload of the bale.

An alternative embodiment is disclosed in FIG. 7 wherein the kicker mechanism is associated with a cradle that is adapted to transport a cylindrical bale with its longitudinal axis parallel to the trailer frame 12 and to unload the bale in a rolling fashion. The design and operation of the kicker mechanism illustrated in FIG. 7 is identical to the design and operation of the kicker mechanism 30 illustrated in FIGS. 1–6 and described above, except that the kicker illustrated in FIG. 7 will apply such a force to the bale 13 which as will cause the bale to unload in a rolling fashion. Likewise, the latch mechanism 140 in the embodiment of FIG. 7 is identical to the latch mechanism 40 illustrated in FIGS. 1–6 and described above. The cradle 120 is in the form of a rectangular frame having two end members 122 and 124, and two relatively longer side members 126 which are parallel to frame 12. As with the embodiment described above, the cradles are mounted with pivots (not shown) on the frame 12 in an offset or biased position, whereby a larger part of the weight of the bale will be on one side of frame 12 to allow the cradle to rotate and the bale to roll off the cradle under the weight of gravity. A bale kicker mechanism consisting of side members 132, end member 133 and chains 135, is pivotally mounted on and positioned within cradle 120 as described above in connection with the embodiment of FIGS. 1–6. The kicker shown in FIG. 7 is designed and functions as the kicker 30 described in connection with the embodiment previously disclosed herein. The operation of the embodiment disclosed in FIG. 7 is identical to the embodiment disclosed above, except that the bale will be propelled to roll off of the cradle and onto the ground on its round side.

Figure 8:
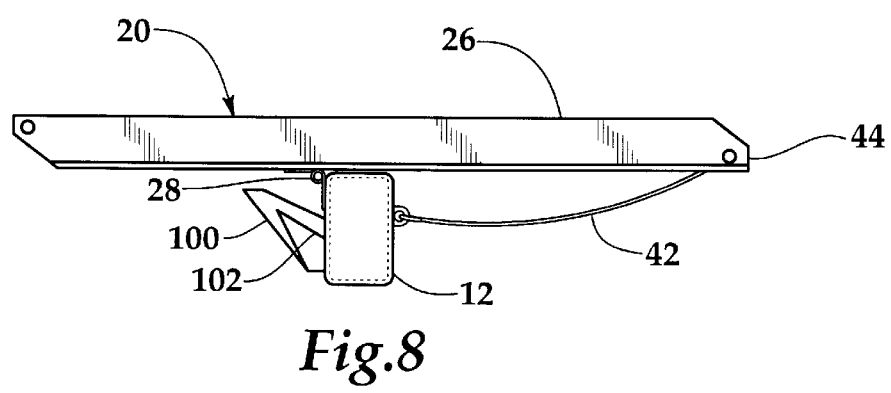
FIG. 8 is a side elevation view of a bale cradle in which the associated kicker is a stationary member rigidly fixed to the trailer frame and angled toward the cradle so as to contact the bale when the cradle rotates from its transport position to its unload position.

A third embodiment of the invention is illustrated in FIG. 8 which shows a cradle 20 mounted on the trailer frame 12 and the release handle which, when pulled, will cause the release pin 46 (not shown) to disengage from the frame and permit cradle 20 to rotate by means of pivot 28. In this embodiment, the bale kicker is an upwardly projecting member 100 which is rigidly affixed to the frame 12 at such an inclination that, when the cradle 20 rotates downwardly, the arm 100 will come into contact with the bale and apply an outward force to the bale to propel it out of the cradle. A bracing member 102 may be added to provide support for the bale pusher-kicker 100. This stationary arm bale kicker of this third embodiment is useful with cradles which are oriented either longitudinally to the frame 12 for an end-over-end unload or transversely to the frame 12 for a rolling unload.

This invention of a trailer provides a useful apparatus which permits the loading of large cylindrical bales using conventional farm equipment, and permits the unloading of such bales under the force of gravity, whether such bales are flattened, misshapen or out-of-round due to settlement during storage and/or transportation. Moreover, this new apparatus always unloads the cylindrical bales in the most desirable orientation with the round side of the bale on the ground in the watershed orientation and with the two flat ends exposed for feeding by the livestock. It will be appreciated by those skilled in the art that changes could be made to the embodiments described above without departing from the inventive concept hereof. It is understood, therefore, that this invention is intended to cover all modifications which are within the spirit and scope of the invention as defined by the appended claims.

I claim:

1. A cylindrical bale trailer comprising:

a wheel-mounted frame;

a cradle pivotally mounted on said frame, said cradle being capable of receiving and supporting a cylindrical bale, and said cradle being capable of rotating from a horizontal position to a non-horizontal position;

latch means for releasably locking said cradle in said horizontal position, whereby actuation of said latch means will permit said cradle to rotate from said horizontal position to said non-horizontal position; and means for contacting said bale and applying a force thereto to propel said bale out of said cradle.

2. The cylindrical bale trailer of claim 1 wherein:

said force is applied to the bale while said cradle is rotating from said horizontal position to said non-horizontal position.

3. The cylindrical bale trailer of claim 1 wherein:

said cradle rotates from said horizontal position to said non-horizontal position under the force of gravity.

4. The cylindrical bale trailer of claim 1 wherein:

said cradle is oriented to carry said bale with said bale's longitudinal axis transverse to said frame.

5. The cylindrical bale trailer of claim 1 wherein:

said cradle is oriented to carry said bale with said bale's longitudinal axis parallel to said frame.

6. The cylindrical bale trailer of claim 1 wherein:

said means for contacting the bale consists of a U-shaped member pivotally mounted on said cradle and having chains connected between said U-shaped member and said frame to limit the motion of said U-shaped member.

7. The cylindrical bale trailer of claim 1 wherein:

said means for contacting the bale consists of an arm fixedly attached to said frame and extending upwardly therefrom, whereby, when said cradle rotates from said horizontal position to said non-horizontal position, said arm will contact said bale and impart an outward force thereto.

8. A cylindrical bale trailer comprising:

(a) a wheel-mounted frame;

(b) a cradle pivotally mounted on said frame to have a horizontal position and an inclined position, said cradle being capable of receiving and supporting a cylindrical bale with the longitudinal axis of said bale oriented transversely to said frame, and said cradle further being capable of rotating to said inclined position;

(c) latch means for releasably locking said cradle in said horizontal position, whereby release of said latch means will permit said cradle to rotate to said inclined position; and (d) means for contacting and propelling said bale in an end-over-end fashion out of said cradle.

9. The cylindrical bale trailer of claim 8 wherein:

said means for contacting and propelling said bale is pivoted to move relative to said cradle while said cradle pivots from said horizontal position to said inclined position.

10. The cylindrical bale trailer of claim 8 wherein:

said means for contacting and propelling said bale is pivotally mounted on said cradle and is restrained in its pivoting motion relative to said cradle by being connected to said frame by a fixed length of chain.

11. The cylindrical bale trailer of claim 8 wherein:

said cradle is a four-sided rectangular frame and said means for contacting and propelling said bale is pivotally mounted within said cradle rectangular frame.

12. The cylindrical bale trailer of claim 8 wherein:

said means for contacting and propelling said bale is a U-shaped frame having bale contacting arms at its closed end, having its parallel sides pivotally mounted to said cradle and having its sides at the open end connected to said frame by fixed lengths of chain.

13. A cylindrical bale trailer comprising:

(a) a frame consisting of an enlongated tubular member;

(b) a wheel-mounted axle supporting said frame;

(c) a rectangular cradle pivotally mounted on said frame, said cradle being capable of receiving and supporting a cylindrical bale;

(d) a releasable latch for locking said cradle in a horizontal transport position;

(e) a pusher mechanism pivotally mounted within said cradle, said pusher mechanism having bale contacting arms, whereby when said latch is actuated to release said cradle from its locked horizontal position, one end of said cradle will rotate toward the ground and simultaneously said pusher mechanism will rotate with respect to said cradle so that said bale contacting arms will push against said bale and propel said bale out of said cradle.

14. The trailer of claim 13 further comprising a plurality of cradles each of which has a bale pusher means.

15. The trailer of claim 13 wherein:

said cradle is capable of receiving and supporting a cylindrical bale with the longitudinal axis of said bale oriented parallel to said frame and said bale contacting arms push against said bale and propel said bale out of said cradle in rolling fashion.

16. The trailer of claim 13 wherein:

said pusher mechanism is an arm rigidly affixed to said frame and which projects upwardly therefrom so as to contact said bale when said cradle rotates to unload said bale.

* * * * *